(No Model.)
W. GOLDING.
PNEUMATIC TIRE.
No. 487,522. Patented Dec. 6, 1892.
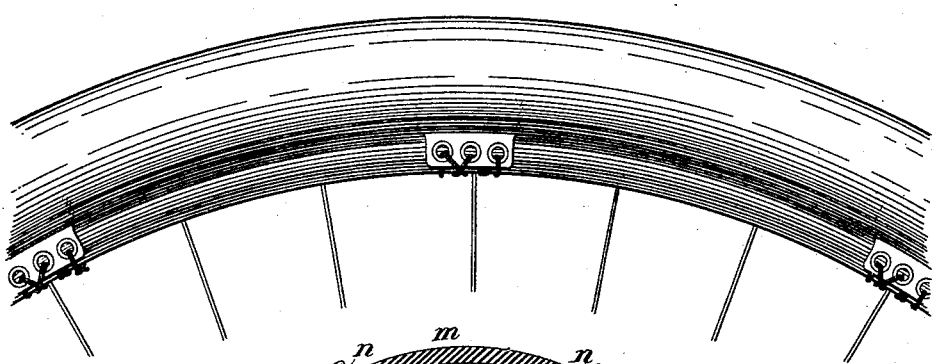
FIG: 1.
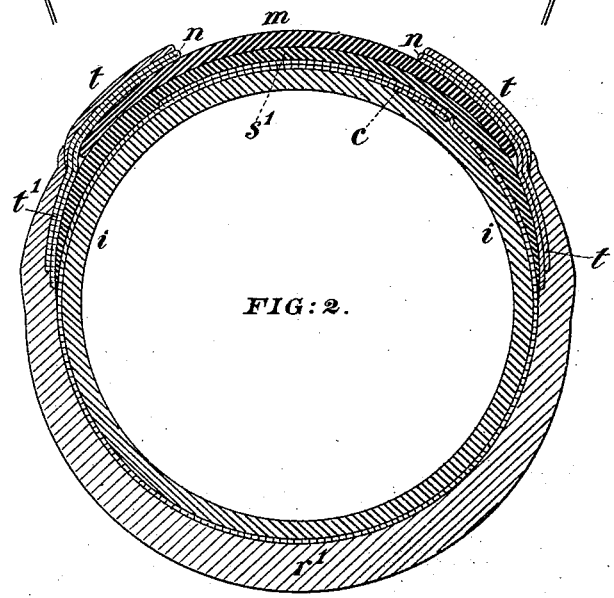
FIG: 2.
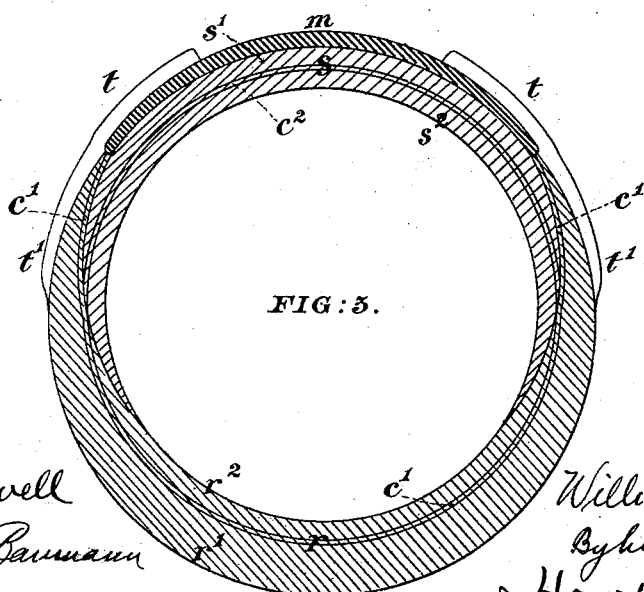
FIG: 3.
Witnesses.
John Revell
George Baumann
Inventor.
William Golding
By his Attys.
Howson and Howson
THE NORRIS PETERS CO., PHOTO-LITHO., WASHINGTON, D. C.

UNITED STATES PATENT OFFICE.

WILLIAM GOLDING, OF MANCHESTER, ENGLAND, ASSIGNOR TO CHARLES MACINTOSH & COMPANY, LIMITED, OF SAME PLACE.

PNEUMATIC TIRE.

SPECIFICATION forming part of Letters Patent No. 487,522, dated December 6, 1892.

Application filed September 18, 1891. Serial No. 406,051. (No model.) Patented in England February 21, 1891, No. 3,178.

*To all whom it may concern:*

Be it known that I, WILLIAM GOLDING, a subject of the Queen of Great Britain and Ireland, residing at Moss Side, Manchester, in the county of Lancaster, England, have invented Improvements in Pneumatic Tires for the Wheels of Velocipedes and other Vehicles, (for which I have applied for British Patent No. 3,178, dated February 21, 1891,) of which the following is a specification.

My invention consists of improvements in the construction of pneumatic wheel-tires.

In the accompanying drawings I have shown my improvements as applied to a construction of tire which is adapted to be secured to the rim of the wheel by means of tabs.

Figure 1 represents a side view of part of a tire and rim. Figs. 2 and 3 are sectional views of my improved tire.

I construct the tire, preferably, of two strips of amalgamated rubber and canvas. (See Fig. 3.) One of these strips $s$ consists of a strip of canvas $c^2$, in one piece, cut on the bias or cross, rubber-solutioned on both sides, and coated with a strip of rubber $s'$ on one side and a strip of rubber $s^2$ on the other. These may be strips of equal thickness throughout, with the edges beveled off, or they may be built up and rolled or molded into shape. The other strip $r$ is wider and is built up in the usual way of several strips of rubber of different widths, so as to be thickest in the middle. When nearly of the required thickness, (see $r'$,) a strip of canvas $c'$, cut on the bias or cross and solutioned on both sides, is placed on the top and is smoothed and pressed into it. A thin strip of rubber $r^2$ is then smoothed and pressed upon that. This compound strip is rolled or molded into the crescent shape shown in the figure. These two built-up strips $r$ and $s$ are next placed upon a round mandrel—that is, a straight cylindrical metal bar or tube—of the diameter of the hollow core of the tire. The two strips $r$ and $s$ are made sufficiently wide so that when placed upon the mandrel on opposite sides the edges will overlap each other. The narrower strip $s$ is preferably placed with the edges inside next the mandrel. The tabs or lugs, which are preferably made of strips of canvas cut on the straight or of double-ply canvas galloon $n'$, Fig. 2, saturated with solution and coated with rubber, are interposed at intervals between the overlap of the two strips $r$ and $s$. (See $t\ t'$, Fig. 2.)

Fig. 2 represents a cross-section of the tire through the tabs, and Fig. 3 a cross-section between the tabs. It will be seen that the edges of the two strips $r$ and $s$ come together between the tabs; but when the tabs are inserted the edges of the strip $r$ are stretched over them and bind them firmly down to the edges of the strip $s$.

An alternative arrangement of the parts on the mandrel is to place the constituents $r^2$ with $s^2$, $c'$ with $c^2$, and $s'$ and $r'$ separately on the mandrel in the order named, or the inner skin of the rubber and the strengthening-canvas may each consist of one strip with one overlapping joint in each. This latter arrangement is represented in Fig. 2. These two arrangements, as indicated in Figs. 2 and 3, may also be combined in different ways in order to obtain the same result. The inner skin or tube of rubber $i\ i$, Fig. 2, may be left out, in which case the canvas tube $c$ forms a lining for the rest of the tube. The inner tube $i\ i$ may be inserted after vulcanization and form a separate air-bladder. The free ends of the tabs are placed over the thinner strip and are prevented from adhering to it during the subsequent operations by a layer of gauze or of powdered talc being placed between. The mandrel is then rolled in the usual way until the outer surface is smooth and the layers of rubber and canvas thoroughly joined. The tube thus formed is cylindrical in shape, with the hollow core also cylindrical, but eccentrically placed, one end of each of the tabs or lugs being also embedded in the wall.

Instead of the ends of the tabs being inserted between the strips they may be laid flat on the sides of the tube and pressed or rolled in. (See $t\ t'$, Fig. 3.) The tabs are, however, not so securely fixed by this method. The tube, with the mandrel inside, is wrapped in cloth and vulcanized. In some cases before wrapping I place a straight length of the metal rim $m$ upon it and pass the free ends of the tabs or lugs over it. After vulcanizing, the tube having been removed from the mandrel, the inlet-pipe, with valve, is inserted and secured in place with rubber solution.

The tire is secured to the rim by connecting together the edges of the tabs over the inner curve of the rim or by connecting the edges of the tabs to the corresponding edges of the rim. When the tabs are intended to be fastened together over the rim, they are formed in pairs, each pair being placed so that the ends can be approached together over the rim and then connected together by lacing or tying with laces, cord, or wire or by sewing or similar efficient means, so that they may securely hold the tire to the rim and yet allow of its being readily detached and replaced. The rim employed is that generally in use for pneumatic tires, being either solid or hollow and shaped with a shallow concave surface outwardly. The tire is placed round the concavity of the rim and the tabs are secured as just previously described. When the tire is inflated, it is firmly held in position.

Instead of using canvas strips cut on the bias or across for incorporating in the walls of the tires, as hereinbefore described, strips of silk or other fabric cut or manufactured so as to be easily extensible may be employed. It is essential that such strips should be capable of stretching longitudinally with the rubber. When the canvas strips are cut on the bias or cross and incorporated with the rubber, the warp and weft threads form, in effect, cross-hoops, which are capable of extension and contraction in either direction with the rubber. If stretched longitudinally, they contract the tire laterally, and vice versa. The result is that they protect the tire by preventing the deformation and rupture which would otherwise be caused by overstretching and thinning of its wall under the tension of compressed air, and at the same time these strips do not destroy the useful flexibility and elasticity of the tire.

When the tire is placed somewhat tightly round the groove of the rim and then inflated, the air-pressure increases the diameter in cross-section, which causes the tire to contract upon and clasp the rim. Under the circumstances eight, ten, or twelve tabs are sufficient to hold it securely, the number depending upon the size of the wheel and the shallowness of the rim.

When the tire constructed as hereinbefore described is being ridden over obstacles, the outer curve stretches longitudinally and contracts laterally over the obstacle, and thus temporarily absorbs it, which is tantamount to removing it out of the way. A smooth passage without vibration is thus secured over a rough road.

Punctures are repaired as follows: The tire is loosened from the rim. In the case of a separate inner tube the strip over the longitudinal slit is unsealed with naphtha or benzoline, the joint of the inner tube unsealed, and the tube withdrawn, patched, and returned. In the case of a single outer tube constructed to hold the compressed air a small cross-slit is cut on the inner curve sufficiently large to admit the forefinger, by means of which a patch of thin sheet-rubber is solutioned in the interior over the puncture, the slit being closed by an interior patch of rubber.

I claim as my invention—

In an inflatable tire for wheels, the covering for a pneumatic tube, consisting of a complete tubular ring, the said covering being made of two curved or crescent-shaped segments of rubber, each overlapping at the edges and cemented and vulcanized together and provided with a tubular lining of textile fabric cut on the bias or cross with the edges overlapped longitudinally for the purpose that when it is made to expand by inflation of air it will contract in length, and thus grasp tightly round the rim of the wheel, substantially as described.

In testimony whereof I have signed my name to this specification in the presence of two subscribing witnesses.

WM. GOLDING.

Witnesses:
GEORGE DAVIES,
CHARLES A. DAVIES.